(12) United States Patent
Hofacker et al.

(10) Patent No.: US 9,358,729 B2
(45) Date of Patent: Jun. 7, 2016

(54) METHOD FOR SELECTIVE LASER SINTERING AND SYSTEM FOR SELECTIVE LASER SINTERING SUITABLE FOR SAID METHOD

(75) Inventors: Oliver Hofacker, Berlin (DE); Martin Schäfer, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 663 days.

(21) Appl. No.: 13/825,893

(22) PCT Filed: Sep. 22, 2011

(86) PCT No.: PCT/EP2011/066516
§ 371 (c)(1),
(2), (4) Date: Jun. 17, 2013

(87) PCT Pub. No.: WO2012/038507
PCT Pub. Date: Mar. 29, 2012

(65) Prior Publication Data
US 2013/0264750 A1    Oct. 10, 2013

(30) Foreign Application Priority Data
Sep. 23, 2010    (DE) .......................... 10 2010 041 284

(51) Int. Cl.
| | |
|---|---|
| B29C 67/04 | (2006.01) |
| B22F 3/105 | (2006.01) |
| B29C 67/00 | (2006.01) |

(52) U.S. Cl.
CPC ............. *B29C 67/04* (2013.01); *B22F 3/1055* (2013.01); *B29C 67/0077* (2013.01); *B22F 2003/1056* (2013.01); *Y02P 10/295* (2015.11)

(58) Field of Classification Search
None
See application file for complete search history.

(56) References Cited

U.S. PATENT DOCUMENTS

| | | | |
|---|---|---|---|
| 5,155,324 A | | 10/1992 | Deckard et al. |
| 5,658,412 A | * | 8/1997 | Retallick .............. B22F 3/1055 156/272.8 |

(Continued)

FOREIGN PATENT DOCUMENTS

| | | |
|---|---|---|
| DE | 19649865 | 2/1998 |
| DE | 10112591 | 10/2001 |

(Continued)

OTHER PUBLICATIONS

International Search Report for PCT/EP2011/066516, mailed on Apr. 5, 2012.

(Continued)

*Primary Examiner* — Ryan Ochylski
(74) *Attorney, Agent, or Firm* — Slayden Grubert Beard PLLC

(57) ABSTRACT

A method and a device perform selective laser sintering. In the method for laser sintering, energy is applied linearly to a cross-sectional surface of the component to be produced in order to compact the powdery material. In the case of components with cross-sectional surfaces that have a curved contour, the application of energy can be guided in a line-shaped manner following the curved contour so that the contour of the workpiece that develops is continuously replicated. Advantageously, irregularities in the contour, which are caused by the raster predetermined by the laser sintering method, can thus be largely avoided. The device for laser sintering includes a powder delivery unit which can rotate about a rotational axis located in the interior of an annularly closed cross-section of the workpiece to be produced.

9 Claims, 3 Drawing Sheets

(56) References Cited

U.S. PATENT DOCUMENTS

| | | | |
|---|---|---|---|
| 6,215,093 B1 | 4/2001 | Meiners et al. | |
| 2004/0099996 A1 | 5/2004 | Herzog | |
| 2004/0265413 A1 | 12/2004 | Russell et al. | |
| 2006/0108712 A1 | 5/2006 | Mattes | |
| 2011/0190904 A1* | 8/2011 | Lechmann | A61B 17/7208 623/23.61 |
| 2011/0217457 A1 | 9/2011 | Huttner et al. | |
| 2015/0004046 A1* | 1/2015 | Graham | G06T 19/00 419/53 |
| 2015/0041025 A1* | 2/2015 | Wescott | B23K 9/042 148/538 |
| 2015/0158251 A1* | 6/2015 | Carrouset | B22F 3/1055 700/119 |

FOREIGN PATENT DOCUMENTS

| | | |
|---|---|---|
| DE | 10235434 | 2/2004 |
| DE | 102007036370 | 10/2008 |
| DE | 102007057130 | 1/2009 |
| DE | 102006059851 | 7/2009 |
| DE | 102008056336 | 5/2010 |
| DE | 102010041284.8 | 9/2010 |
| EP | 1419836 | 5/2004 |
| EP | 2286982 | 2/2011 |
| EP | 2011/066516 | 9/2011 |
| WO | 2008/074287 | 6/2008 |
| WO | 2009/015619 | 2/2009 |

OTHER PUBLICATIONS

German Office Action for Priority German Patent Application No. 102010041284.8, issued on Mar. 30, 2011.

European Office Action for related European Patent Application No. 11 767 399.6, issued Mar. 25, 2014, 4 pages.

* cited by examiner

METHOD FOR SELECTIVE LASER SINTERING AND SYSTEM FOR SELECTIVE LASER SINTERING SUITABLE FOR SAID METHOD

CROSS REFERENCE TO RELATED APPLICATIONS

This application is based on and hereby claims priority to International Application No. PCT/EP2011/066516 filed on Sep. 22, 2011 and German Application No. 10 2010 041 284.8 filed on Sep. 23, 2010, the contents of which are hereby incorporated by reference.

BACKGROUND

The invention relates to a method for selective laser sintering in which a workpiece is produced layer by layer by irradiating a powder bed formed of the material of the workpiece by at least one linear application of energy of a laser beam. The invention also relates to a system for selective laser sintering with a process chamber, in which a support for a workpiece to be produced and a powder distributor for creating a powder bed on the support are provided.

A method of the type specified at the beginning is known for example from DE 10 2006 059 851 B4. In the case of the method for selective laser sintering that is described, a workpiece is produced by the individual layers of the powder bed being melted by a plurality of linear applications of energy of a laser beam. The linear applications of energy are in this case in straight lines and respectively extend only over individual portions of the surface area to be produced of a layer that cover a segment of the overall surface area. In this case, the individual applications of energy are combined with one another, with the stipulation that only one linear application of energy respectively takes place alternately in each sub-portion, so that this individual portion can in each case cool down before the next application of energy. The aim is to obtain a lower-stress microstructure of the component produced.

The linear applications of energy of neighboring sub-portions of the surface area are preferably aligned at right angles to one another. Here it is unavoidable that the linear applications of energy respectively end at the contour-forming ends of the cross-sectional area to be produced in the powder bed. Here the process causes a certain surface roughness to be created in the contour, dictated by the width of the melt bath of the selective powder melting. It follows from this that the achievable surface quality of the selective laser sintering concerned is limited by the process. If it is intended to produce a better surface quality with given parameters for the selective laser sintering, this can only be achieved by reworking of the surfaces.

A system for selective laser sintering is known from DE 10 2007 036 370 B3. This system has a support for a workpiece in a chamber. This support is distinguished in particular by the fact that it is provided with a recess, so that a prefabricated workpiece can be inserted there. With the part protruding from this recess, the workpiece can then be subjected to a treatment by selective laser sintering in the system. For this purpose, the powder from which the workpiece is intended to be produced is applied to the support. A powder distributor, which includes a metering device and a doctor blade, is used, these devices allowing a planar surface of the powder bed to be created. The laser inscribes as it were the cross section of the workpiece to be produced in the surface in the layer concerned, so that the workpiece is completed layer by layer.

According to EP 1 419 836 A1, it is known that the laser can be guided crosswise in the successively produced layers to even out the structure that is created by the laser sintering. In order to improve the structure in the peripheral region of the component created, it may be provided according to U.S. Pat. No. 5,155,324 that the contour is followed by the laser in the respectively produced layer of the component. Specifically for annular cross sections of the component that are created, it may be provided according to DE 101 12 591 A1 that the laser is guided spirally, for example from the outer contour to the inner contour. According to DE 10 2006 059 851 B4, it is also proposed that, to improve the result, the cross-sectional area to be created of a component may be notionally divided up into different regions, parts of the cross section being produced in different regions in continuous alternation, so that at the end the complete cross section is melted.

DE 102 35 434 A1 presents a machine for generative production processes in which the building platform on which the powder is applied layer by layer is movably arranged. This platform can in particular be rotated about an axis of rotation and thereby raised or lowered according to the layer produced.

DE 10 2008 056 336 A1 also describes that generative production processes can also be used, inter alia, as methods for repairing turbine blades.

SUMMARY

One potential object is to provide a method for selective laser sintering and a system for selective laser sintering with which, in the production of the workpieces, a comparatively good surface quality of the workpiece can be achieved and, in particular, reworking of the workpiece can be avoided.

The inventors propose a method for selective laser sintering in which a workpiece is produced layer by layer by irradiating a powder bed formed of the material of the workpiece by at least one linear application of energy of a laser beam, in that the workpiece at least partially has a curved contour in the cross section defined by the surface of the powder bed and, at least during the first linear application of energy, the laser beam is guided so as to follow the curved contour in such a way that the contour is continuously replicated by the sintered material. For the purposes of this discussion, a linear application of energy should be understood as meaning the passing of the laser beam over a specific linear portion of the cross section to be produced of the workpiece. A linear application of energy therefore comprises aligning the laser with the starting point of this linear application of energy, guiding the laser beam along the imaginary line of the linear application of energy and switching off the laser when the end of this imaginary line is reached. It is provided that at least a first linear application of energy is designed such that the imaginary line that the laser beam follows, follows the curved contour of the workpiece. This requires a distance from the actual contour of the cross section that is defined by the extent of the melt bath created by the laser beam in the surface of the powder. This is because it ensures that the contour itself is formed by the periphery of the melt bath and so, the continuous replication of the contour is also made possible. This has the advantage that the aforementioned irregularity caused by the rastering that can be achieved by the laser sintering is avoided, at least in the region of the curved contour, whereby the surface quality of the component produced is improved. There is then advantageously no need for reworking.

Whenever a first linear application of energy is referred to in relation to this document, it means at least one of the linear applications of energy that are required for the production of the cross section concerned of the workpiece. This first linear application of energy does not have to be the first application of energy in terms of time for producing the cross section of the component. Rather, it means that at least the one (first) linear application of energy is designed to follow the curved contour, which does not exclude the possibility that further applications of energy (a second, a third, and so on) are aligned in the way proposed on the curved contour. Indeed, the wording is expressly intended not to exclude the possibility that the first linear application of energy, which follows the curved contour, is for example the third or some other application of energy among the various linear applications of energy in the production sequence.

According to the proposals, it is also provided that the workpiece has an annularly closed cross section, in particular a circular-annular cross section, defined by the surface. Workpieces with annularly closed cross sections may for example be housing structures. These are produced layer by layer, annular cross sections being obtained in the region where the layers intersect as it were the perpendicular housing wall. For example, a tube that is produced with a perpendicular axis of symmetry would have a circular-annular cross section. The production of workpieces of cross sections defined by the powder bed that are annularly closed is particularly advantageous since, in the case of such cross sections, usually large regions with a curved contour occur, and these can be advantageously produced with high surface quality.

It is therefore particularly advantageous if the workpiece is a burner in which the burner opening is being produced or repaired. Burners, as used for example in gas turbines, are exposed to high thermal stress. Particularly the burner openings, in the region of which the flame of the burner is produced, therefore limit the lifetime of the burner as a whole. It is therefore of particular advantage if this region can be repaired by the method for selective laser sintering. For this purpose, a defective location at the periphery of the burner opening is removed, or even the entire ring forming the burner opening is removed. This ring is subsequently built up again on the rest of the burner by the selective laser sintering. The high surface quality to be produced is of advantage here, since the burner opening produced with increased surface quality in comparison with conventional laser sintering methods is less susceptible to cracking caused by thermal stresses.

The proposals are also distinguished by the fact that only a first sub-portion of the curved contour is formed by the first linear application of energy, and sub-portions of the curved contour that are adjacent this sub-portion are only formed by further linear applications of energy when the material of the first sub-portion has cooled down below a required temperature. The statement made with respect to the first linear application of energy applies correspondingly to the first sub-portion, i.e. the first sub-portion does not have to be the one that is irradiated first in the time sequence of the irradiation of the sub-portions, but only irradiated before the further linear applications of energy. However, this does not mean that further sub-portions may have already been irradiated before the first sub-portion. The subdivision of the curved contour into a plurality of sub-portions and the production in the form of short linear applications of energy made to match the sub-portions has the advantage that local heating up of the component by the application of energy of the laser beam can be kept within limits. Furthermore, a further treatment is only ever carried out when the required temperature of the already produced sub-portion concerned has been reached. The required temperature is dictated by the formation of internal stresses in the microstructure that are caused by the component always being heated up locally during the production of the layer concerned. Overall, therefore, this refinement of the method allows the creation of a component in which there are lower internal stresses in the microstructure.

According to another refinement, it is provided that further linear applications of energy that run parallel to the first linear application of energy are performed. In this case it is only the first linear application of energy that is involved in the formation of the contour, since the periphery of the material sintered by this application of energy defines the contour of the cross section concerned. However, it is advantageous if the further linear applications of energy run parallel to the first linear application of energy, because the cross-sectional area to be melted can then be filled by a comparatively simple arrangement of the linear applications of energy. Furthermore, a parallel arrangement of the linear applications of energy can have positive effects on the stresses occurring in the microstructure. Alternatively, it is of course also possible that the first linear application of energy forms as it were the outline of the cross section and the interior of the cross section is filled in accordance with any other patterns desired. In this case, the ends of the linear applications of energy advantageously do not however come up against the contour of the cross section to be formed, but against the outline formed by the first linear application of energy, so that the surface quality is defined by this outline.

A particular refinement is obtained if a plurality of laser beams that are arranged offset one behind the other, as seen in the direction of the parallel linear applications of energy, are used simultaneously. This creates a cascade of laser beams, with which a comparatively wider region of the cross-sectional area adjoining the contour of the cross section concerned can be melted in a comparatively short time. The spacing of the laser beams transversely in relation to the alignment of the lines of the applications of energy corresponds precisely to the width of the melt baths created by the laser beams. The spacing of the lasers, as seen in the direction of the lines of the applications of energy, may thus be chosen such that cooling down of the respectively sintered material to the required temperature is ensured before the following laser beam is guided past the location concerned. The required temperature of the sintered material is dictated by the circumstances of the individual application, and is determined primarily by the requirement that the internal stresses produced by the local heating up of the workpiece must not become too great.

It is particularly advantageous if the surface of the powder bed is produced by a powder distributor being rotated about an axis of rotation that lies inside the annularly closed cross section and perpendicularly in relation to the surface of the powder bed. Such an arrangement of the powder distributor is advantageously only possible when an annularly closed cross section is produced. The fact that the powder inside the annularly closed cross section does not have to be compacted makes it possible to arrange the powder delivery unit with its axis of rotation within this inner part of the powder that does not have to be compacted. Then the powder distributor can rotate about its axis of rotation and consequently passes over the powder bed more or less at right angles to the annular shape of the closed cross section. This makes effective powder distribution possible; in particular, it can also take place continuously, the compaction of the powder bed by the laser beam respectively taking place behind the powder distributor. The powder distributor advantageously includes a metering unit, which has for example a slit-shaped outlet for the powder to be distributed and a doctor blade, which ensures a planar surface of the powder bed by passing over the metered powder.

It is also advantageous if the workpiece is continuously lowered and the powder distributor is continuously rotated in such a way that, after a full revolution of the powder distributor, the workpiece has been lowered by precisely one layer thickness. This advantageously makes a continuous laser sintering sequence possible. The laser beam does not have to be switched off for the purpose of applying a new layer of powder, so that the process times of the method can be advantageously shortened. All that has to be ensured in the implementation of the method is that, during the continuous production, wherever the powder distributor passes over the powder bed, the entire part of the cross section has already been compacted by the laser beam. In this case, the component to be formed strictly speaking does not assume a layered structure, but instead a single helical layer building up on top of itself is produced.

The object stated above is also achieved by the system for selective laser sintering specified at the beginning, in that the powder distributor is held rotatably about an at least substantially perpendicular axis of rotation and is coupled to a drive, which can make the powder distributor perform rotations about this axis of rotation. Consequently, the system has a powder distributor with which the method described above can be advantageously carried out in a simple way. The powder distributor is in this case placed in the powder bed in such a way that the component can be produced with a closed cross section in such a way that the interior that is enclosed by the closed cross section is passed through by the axis of rotation of the powder distributor. This is so because, during a rotation of the powder distributor, reliable powder feeding and creation of a planar surface of the powder bed cannot take place in the region of the axis of rotation. Instead, however, comparatively efficient powder feeding can be realized in the region of the cross section to be produced, by this taking place simultaneously with the treatment by the laser beam in regions of the closed cross section where specifically no powder feeding is required. The associated advantages have already been described above in connection with the explanation of the method.

It is also provided that the powder distributor has a metering device and a doctor blade arranged behind the latter, as seen in the direction of rotation. The powder feeding takes place by way of the metering device, these devices not sufficiently ensuring the production of a planar surface of the powder bed. The doctor blade is subsequently guided over the freshly metered powder material and makes the surface of the powder bed more even, excess powder material being removed from the powder bed. Particularly smooth surfaces of the powder bed can be advantageously created in this way.

A further refinement envisages the provision of a control device that allows a continuous rotation of the powder distributor at a given rotational speed. Such a control device advantageously facilitates in particular continuous operation of the powder distributor. This distributor can rotate at a specific rotational speed, while at the same time a treatment of the already formed surface of the powder bed takes place by the laser beam. The control device ensures that the position of the powder distributor during the treatment by the laser is known, so that the possibility of the laser beam harming the powder distributor can be ruled out. This therefore allows the production process to be advantageously carried out very efficiently.

According to a particular refinement, it is provided that the control device can synchronize the rotational speed of the powder distributor with a lowering speed of a continuous lowering of the support. For this purpose it must also be possible that an activation of the lowering device, that is to say of the drive for the lowering, can be controlled by the control device. It is also advantageous that, for the synchronization of the rotational speed of the powder distributor and the lowering speed, at least one of these two parameters can be set by the control device. For the purposes, a synchronization should be understood as meaning that a specific ratio between the lowering speed of the support and the rotational speed of the powder distributor can be set and maintained. This makes an operating regime that has already been explained above possible, to be specific that a lowering of the support takes place simultaneously with a rotation of the powder distributor, a full revolution of the powder distributor leading to a lowering of the support by precisely one layer thickness. A specific layer thickness per revolution can then be set by the control device. Furthermore, the rotational speed of the powder distributor can be set such that complete working of the cross-sectional area of the workpiece to be produced within one revolution is made possible. The rotational speed therefore depends in particular on the area content of the cross-sectional area and on the number of laser beams used.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
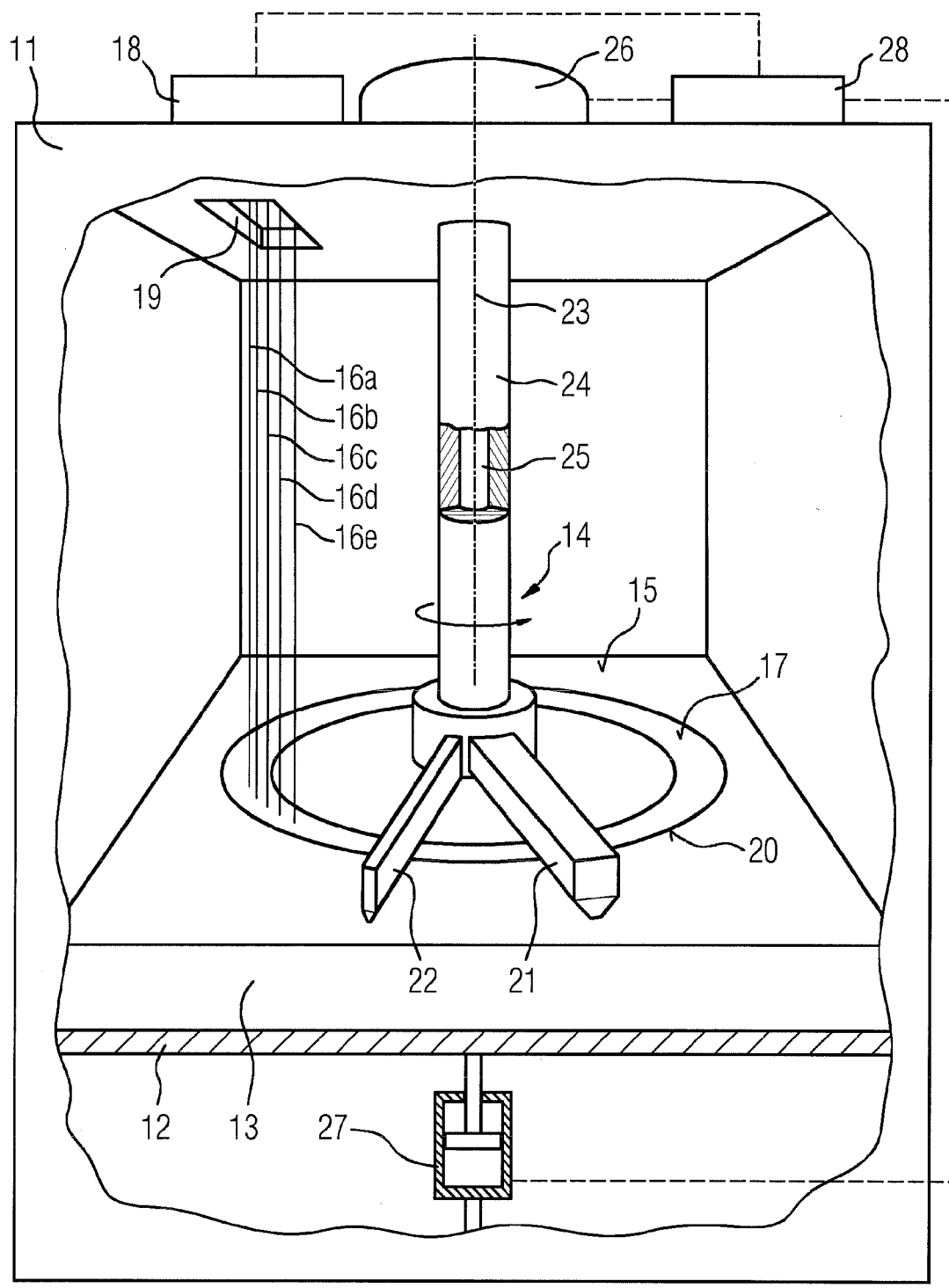
FIG. 1 schematically shows a three-dimensional view of an exemplary embodiment of the proposed system for laser sintering.

Reference will now be made in detail to the preferred embodiments of the present invention, examples of which are illustrated in the accompanying drawings, wherein like reference numerals refer to like elements throughout.

A system for selective laser sintering according to FIG. 1 has a process chamber 11, in which a support 12 for a workpiece that is not represented any more specifically is provided. A powder distributor 14 is used to produce on the support 12 a powder bed 13, which provides a surface 15 that can be irradiated with laser beams 16a, 16b, 16c, 16d, 16e. This irradiation takes place in the region of a cross-sectional area 17 to be formed of the component to be produced, which is located in the powder bed 13 and therefore cannot be seen in FIG. 1. The laser beams are produced by a laser that is accommodated in a laser unit 18 and not represented any more specifically, and are introduced into the process chamber 11 by way of a window 19. Also provided in the laser unit 18 are mirror mechanisms, not represented any more specifically, for deflecting the laser beams, it being possible with the aid of these mechanisms to guide the laser beams over the surface 15 of the powder bed 13. This respectively has the effect of producing the cross-sectional area 17 in the surface 15 of the powder bed 13 that has a curved contour 20.

The powder is fed by way of the powder distributor 14. This distributor has a metering device 21 with a downwardly directed metering slit, not represented any more specifically, and a doctor blade 22. The metering device is rotated about an axis of rotation 23 in the direction of the arrow indicated, so that the doctor blade 22 follows the metering device 21. This allows irregularities that occur when there is insufficiently accurate metering to be evened out by the doctor blade 22. This has the effect of producing the surface 15 of the powder bed 13 that can subsequently be worked. The metering device 21 and the doctor blade 22 are attached to a holding rod 24 that is mounted rotatably in the axis of rotation 23. As represented in the partly broken-away region, this holding rod is provided inside with a feed line 25 for the powder. Also provided, on the outside of the process chamber 11, is a drive 26, which can make the powder distributor perform rotations. This distributor includes an electric motor that is not represented any more specifically. It may optionally also be provided that the holding rod 24 can be axially moved, in order to be able to produce layers of the powder bed lying one on top of the other.

In the configuration according to FIG. 1, however, the production of the successive layers of the powder bed is performed by a lifting drive 27 for the support 12 that is merely represented schematically as a hydraulic cylinder. This allows the support 12 to be lowered in stages, in order to be able to create new layers in the powder bed over and over again. This bed then becomes increasingly deep, thereby creating the successive cross sections 17 of the workpiece to be produced.

Also represented in FIG. 1 is a controller 28, which has several tasks. Control lines are indicated by dashed lines, it being clear that the control device 28 controls not only the rotation of the drive 26 for the powder distributor 14 but also the lifting drive 27 for the support 12 and the laser unit 18. This allows the process devices to be synchronized in such a way that feeding of powder and laser treatment are possible simultaneously.

Figure 2:
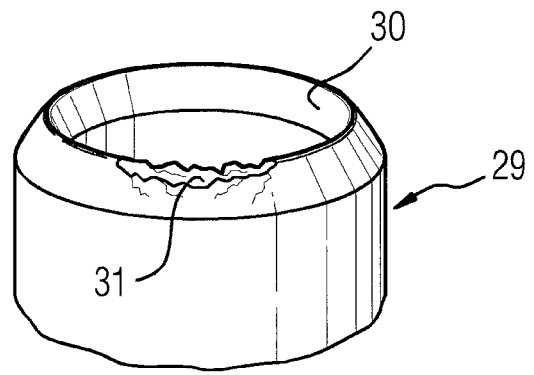
FIGS. 2-4 show a three-dimensional representation of various stages of an exemplary embodiment of the proposed method for selective laser sintering, applied to the burner opening of a burner for gas turbines, and FIGS. 5-7 schematically show various cross-sectional areas of components to be produced with curved contours by linear applications of energy according to further exemplary embodiments of the proposed method (FIGS. 5 and 7) and according to the related art (FIG. 6).
Figure 3:
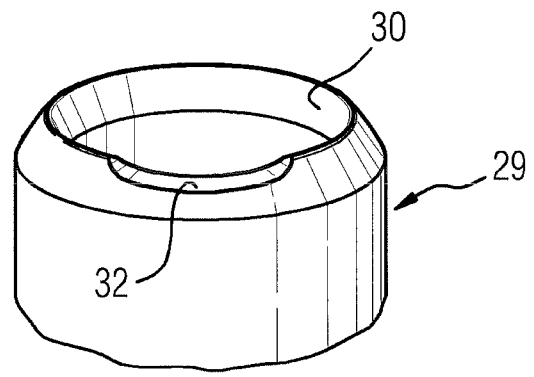
Figure 4:
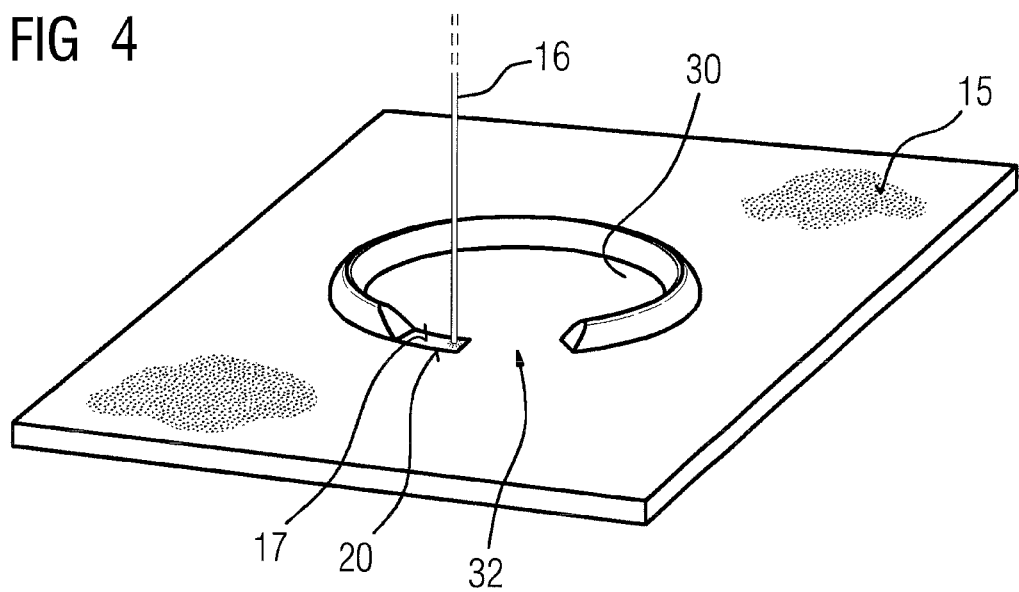

According to FIGS. 2 to 4, a burner for gas turbines, the burner opening 30 of which has suffered damage 31 as a result of the thermal stresses occurring during operation (cf. FIG. 2), is repaired as the workpiece 29. As FIG. 3 reveals, the material of the burner opening 30 has been removed in the region of the damage 31, thereby creating a recess 32, which can be filled by new material. Alternatively (not represented), it is also possible for the entire ring forming the burner opening 30 to be removed, if the rest of this ring has already likewise been attacked in the integrity of its microstructure to the extent that there is already the prospect of damage also occurring in these regions.

The filling of the recess 32 with material takes place by the laser sintering. This is represented in FIG. 4. A part of the surface 15 of the powder bed can be seen as a detail, this part being compacted by the laser beam 16 in the region of the recess 32, whereby the cross-sectional area 17 of the part to be formed of the component 29, done by filling of the recess 32, is created in this region. It can also be seen that the rest of the ring forming the burner opening 30 protrudes from the surface 15 of the powder bed, since material only has to be added in the region of the recess 32.

Figure 5:
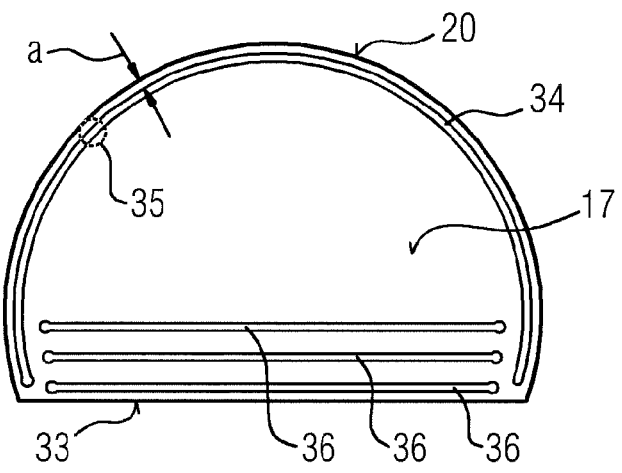
Figure 6:
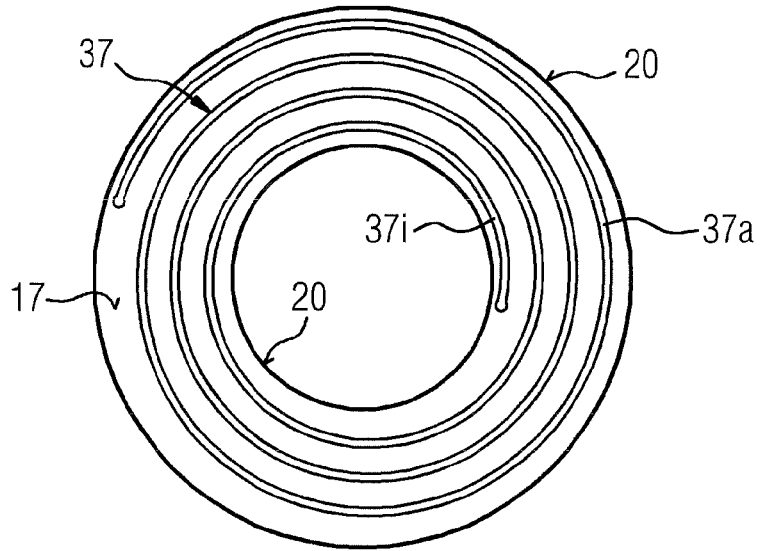
Figure 7:
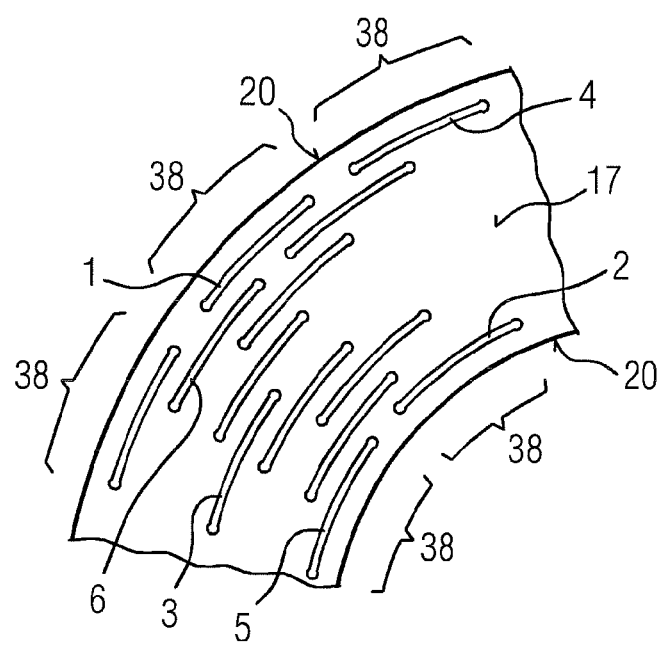

In FIGS. 5 to 7, various cross-sectional areas 17 of components to be produced are schematically represented. FIG. 5 for example reveals that a cross section may only partially have a curved contour 20, there also being a straight portion 33 at the same time in the cross section. In order to be able to produce the curved contour 20 with high surface quality, a curved linear application of energy 34 is provided, following the contour 20 at a close distance. The distance a of the linear application of energy 34 from the contour 20 is precisely half the width of the melt bath (or the heat affected zone for the sintering, hereinafter referred to however as the melt bath width for short, even though a melt bath is not necessarily formed) that the laser (not represented) produces. A melt bath 35 is indicated by way of example, it being clear that it terminates with its periphery precisely at the contour 20. Also represented are further linear applications of energy 36, which run along the straight portion 33 and respectively end directly at the curved linear application of energy 34. In this way, the entire cross-sectional area can be filled with applications of energy, not all of these being represented for the sake of overall clarity.

In FIG. 6, a circular-annular cross-sectional area 17 is represented, as could be formed for example by a burner opening according to FIG. 2. This has both inside and outside a curved contour in the form of a circle. According to FIG. 6, the cross-sectional area 17 is filled by a single linear application of energy 37, running spirally from the outside to the inside. In this case, an outer spiral turn 37a and an inner spiral turn 37i of the application of energy 37 contribute to the formation of the two circular contours in the way.

In FIG. 7, a segment of another cross-sectional area 17 to be formed in the form of a circular ring can be seen. Here, a plurality of linear applications of energy are used, these being so short that they respectively form, inter alia, only sub-portions 38 of the contour 20. The idea here is that the linear applications of energy are performed in a fixed sequence, it being ensured here that successive applications of energy do not lie too close together, so that excessive local heating up of the workpiece forming is avoided. If a specific application of energy 1 is considered to be a first application of energy, the next application of energy 2 is performed for example on the opposite side of the cross section. Subsequently, the next application of energy 3 is performed in the middle of the annular cross section. Only then is the next application of energy 4 performed, following on from the first application of energy 1. Then, the next application of energy 5 can be performed, following on from the application of energy 2. Then, the next application of energy 6 is performed, partly even running parallel to the first application of energy 1, although the latter has in the meantime largely cooled down. In this way, the cross-sectional area can be filled by various applications of energy, until the entire material is compacted. In FIG. 7, only some of the applications of energy are represented for the sake of better overall clarity.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for selective laser sintering, comprising:
   producing a workpiece or portion thereof layer by layer by irradiating a powder bed of material which forms the workpiece by laser energy,
   the workpiece at least partially having a curved contour in a cross section defined by the surface of the powder bed as a cross sectional plane,
   the workpiece having an annularly closed cross section as defined by the surface of the powder bed as a cross sectional plane, and
   the producing the workpiece or portion thereof, comprising forming only a first sub-portion of the curved contour by a first application of energy by a laser beam, the first application of energy performed with the laser beam being guided so as to follow the curved contour to continuously replicate the contour in portions of the powder bed sintered by the laser beam, and forming further sub-portions of the curved contour adjacent to the first sub-portion by further applications of energy by a laser beam only when the material of the first sub-portion has cooled down below a required temperature.

2. The method as claimed in claim 1, wherein the workpiece is a burner in which the burner opening is being produced or repaired.

3. The method as claimed in claim 1, wherein the further applications of energy run parallel to the first application of energy.

4. The method as claimed in claim 3, wherein a plurality of laser beams that are arranged offset one behind the other, in a direction that is at least partially perpendicular to the first application of energy, are used simultaneously.

5. The method as claimed in claim 2, wherein the further applications of energy run parallel to the first application of energy.

6. The method as claimed in claim 5, wherein a plurality of laser beams that are arranged offset one behind the other, in a direction that is at least partially perpendicular to the first application of energy, are used simultaneously.

7. The method as claimed in claim 2, wherein the surface of the powder bed is produced by a powder distributor being rotated about an axis of rotation that lies inside the annularly closed cross section and is perpendicular to the surface of the powder bed.

8. The method as claimed in claim 7, wherein the workpiece is continuously lowered into the powder bed and the powder distributor is continuously rotated in such a way that, after a full revolution of the powder distributor, the workpiece has been lowered by precisely one layer thickness.

9. The method as claimed in claim 1, wherein the annularly closed cross section is a circular-annular cross section.

* * * * *